(12) United States Patent
Tanaka (10) Patent No.: US 10,009,071 B2
(45) Date of Patent: Jun. 26, 2018

(54) ANTENNA AND COMMUNICATION APPARATUS

(71) Applicant: SONY CORPORATION, Tokyo (JP)

(72) Inventor: Katsuyuki Tanaka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days. days.

(21) Appl. No.: 15/531,770

(22) PCT Filed: Nov. 25, 2015

(86) PCT No.: PCT/JP2015/082975
§ 371 (c)(1),
(2) Date: May 31, 2017

(87) PCT Pub. No.: WO2016/093057
PCT Pub. Date: Jun. 16, 2016

(65) Prior Publication Data
US 2017/0272128 A1 Sep. 21, 2017

(30) Foreign Application Priority Data
Dec. 8, 2014 (JP) ................................. 2014-247587

(51) Int. Cl.
*H04B 5/00* (2006.01)
*H04B 13/00* (2006.01)
*H01Q 1/24* (2006.01)

(52) U.S. Cl.
CPC ........... *H04B 5/0081* (2013.01); *H01Q 1/242* (2013.01); *H04B 13/005* (2013.01)

(58) Field of Classification Search
CPC .... H04B 5/0081; H04B 13/005; H04W 4/008
See application file for complete search history.

(56) References Cited

U.S. PATENT DOCUMENTS

2009/0088114 A1 4/2009 Yoshida et al.
2011/0147062 A1* 6/2011 Stevenson ................ H01G 4/35
174/260

(Continued)

FOREIGN PATENT DOCUMENTS

CN 101399570 A 4/2009
JP 2009-081771 A 4/2009

OTHER PUBLICATIONS

International Search Report and Written Opinion of PCT Application No. PCT/JP2015/082975, dated Feb. 9, 2016, 03 pages of English Translation and 08 pages of ISRWO.

*Primary Examiner* — Tuan Pham
(74) *Attorney, Agent, or Firm* — Chip Law Group (57) ABSTRACT

The present disclosure relates to an antenna and a communication apparatus that enables both near field communication using a magnetic field and near field communication using an electric field. The communication apparatus includes a first near field communication unit that performs communication in a non-contact manner using a magnetic field, a second near field communication unit that performs communication in a non-contact manner using an electric field, and an antenna shared by communication of the first near field communication unit and communication of the second near field communication unit. The present disclosure is applicable, for example, to near field communication in which communication using a magnetic field is performed in a non-contact manner, a communication apparatus that enables near field communication using an electric field in a non-contact manner, and the like.

11 Claims, 9 Drawing Sheets

(56) References Cited

U.S. PATENT DOCUMENTS

| | | | |
|---|---|---|---|
| 2011/0241436 A1* | 10/2011 | Furukawa | H02J 5/005 307/104 |
| 2013/0175246 A1* | 7/2013 | Hunt | H05H 1/16 219/121.59 |
| 2016/0149313 A1* | 5/2016 | Gomme | H01Q 21/00 343/725 |

* cited by examiner

| Antenna | SW101 | SW102 | Magnetic field (coil) | Electric field (electrode) | Band | Communication distance | Transmission speed |
|---|---|---|---|---|---|---|---|
| Resonance | ON | ON | ON | ON | Narrow band | Long | Slow |
| Non-resonant | OFF | ON | OFF | ON | Wide band | Short | Fast |
| Non-resonant | ON | OFF | ON | OFF | Wide band | Short | Fast |
| Non-resonant | OFF | OFF | OFF | OFF | Communication impossible | | |

FIG.11

ANTENNA AND COMMUNICATION APPARATUS

CROSS REFERENCE TO RELATED APPLICATIONS

This application is a U.S. National Phase of International Patent Application No. PCT/JP2015/082975 filed on Nov. 25, 2015, which claims priority benefit of Japanese Patent Application No. JP 2014-247587 filed in the Japan Patent Office on Dec. 8, 2014. Each of the above-referenced applications is hereby incorporated herein by reference in its entirety.

TECHNICAL FIELD

The present disclosure relates to an antenna and a communication apparatus, and more particularly to an antenna and a communication apparatus that enable both near field communication using a magnetic field and near field communication using an electric field.

BACKGROUND ART

Near field communication in which wireless communication is performed at a short distance in a non-contact manner using an IC (Integrated Circuit) card or the like is utilized for, for example, an electronic commuter pass, electronic money, or the like. In addition, a mobile phone having an electronic money function utilizing the near field communication has been widely used. According to this kind of the near field communication (hereinafter also referred to as NFC communication), a quasi-static magnetic field is formed in the vicinity of the antenna, and communication is performed.

Further, one of the near field communication using the quasi-static electric field is human body communication in which transmission is performed through a human body as a communication medium (hereinafter also referred to as HBC communication) (for example, see Patent Literature 1). Hereinafter, the quasi-static magnetic field and the quasi-static electric field are simply referred to as a magnetic field and an electric field, respectively.

CITATION LIST

Patent Literature

Patent Literature 1: Japanese Patent Application Laid-open No. 2012-53520

DISCLOSURE OF INVENTION

Technical Problem

To establish the NFC communication, a user has to take out an IC card, a mobile phone having the NFC communication function, or the like, and to bring it close to a partner apparatus. In contrast, to establish the HBC communication, a user does not have to take out a device but only has to touch the device in his pocket or the like with the hand, since the HBC communication employs the properties that the electric field spreads into the human body. Thus, the HBC communication can provide a more intuitive user interface. It is therefore desirable to provide a communication apparatus that can utilize both the currently popular NFC communication and the HBC communication using an electric field.

The present disclosure is made in view of the above-mentioned circumstances, and it is an object of the present disclosure to realize communication of both the near field communication using a magnetic field and the near field communication using an electric field.

Solution to Problem

An antenna according to a first aspect of the present disclosure is shared by near field communication using magnetic field and near field communication using an electric field.

In the first aspect of the present disclosure, the antenna is shared by the near field communication using a magnetic field and the near field communication using an electric field.

A communication apparatus according to a second aspect of the present disclosure includes a first near field communication unit that performs communication in a non-contact manner using a magnetic field, a second near field communication unit that performs communication in a non-contact manner using an electric field, and an antenna shared by communication of the first near field communication unit and communication of the second near field communication unit.

In the second aspect of the present disclosure, the antenna is shared by communication of the first near field communication unit that performs communication in a non-contact manner using a magnetic field and communication of the second near field communication unit that performs communication in a non-contact manner using an electric field.

The communication apparatus may be an independent apparatus or may be an internal block of one apparatus.

Advantageous Effects of Invention

According to the first and the second aspects of the present disclosure, both the near field communication using a magnetic field and the near field communication using an electric field are possible.

It should be noted that the effects described here are not necessarily limitative and may be any of effects described in the present disclosure.

MODE(S) FOR CARRYING OUT THE INVENTION

Hereinafter, modes for carrying out the present disclosure (hereinafter referred to as embodiments) will be described. Note that description will be performed in the following order.

1. First embodiment of communication apparatus (configuration example of communication apparatus including data converter supporting both NFC communication and HBC communication)
2. Second embodiment of communication apparatus (configuration example of communication apparatus including data converter supporting only NFC communication)
3. Third embodiment of communication apparatus (configuration example of communication apparatus including data converter supporting only HBC communication)
4. Fourth embodiment of communication apparatus (configuration example of sharing antenna)
5. Processing flow of communication start
6. Configuration example of shared antennae

1. First Embodiment of Communication Apparatus

Figure 1:
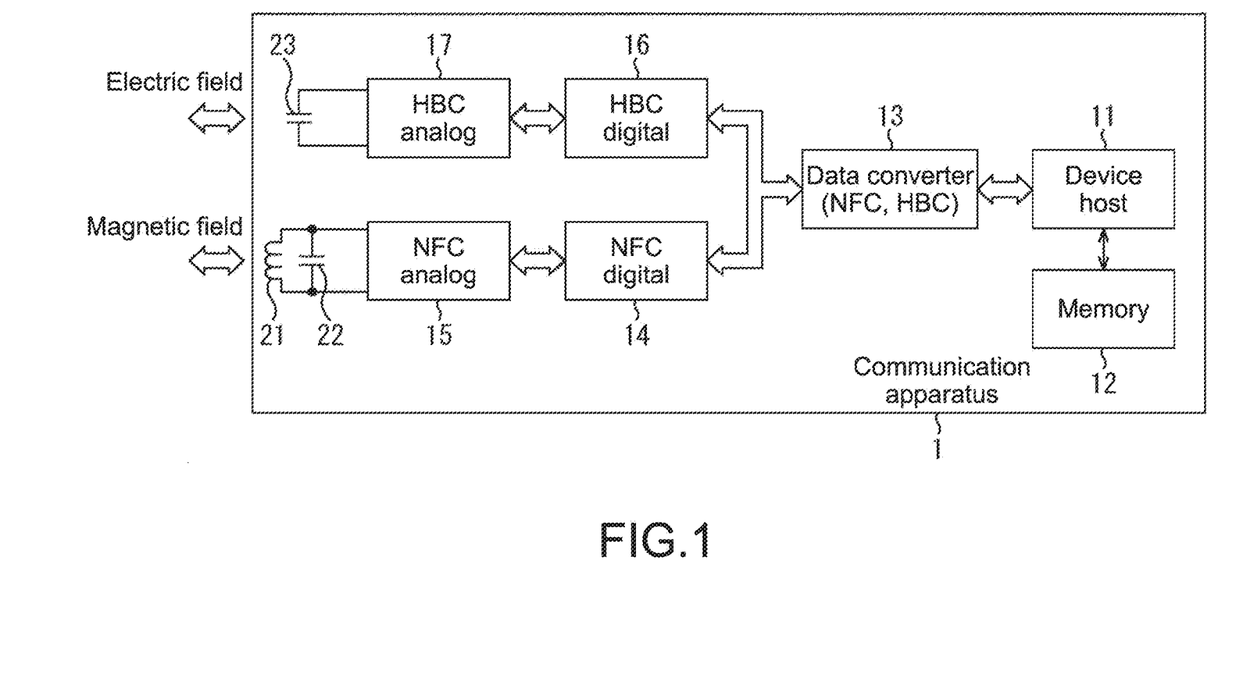
FIG. 1 is a block diagram showing a communication apparatus according to a first embodiment of the present disclosure.

FIG. 1 is a block diagram showing a communication apparatus according to a first embodiment of the present disclosure.

A communication apparatus 1 shown in FIG. 1 is an apparatus that enables both near field communication using a magnetic field, which is generally called as NFC (Near Field Communication), (hereinafter referred to as NFC communication) and near field communication using an electric field.

It should be noted that the communication apparatus 1 described below performs, as the near field communication using an electric field, for example, human body communication using a human body of a user as a communication medium (hereinafter also referred to as HBC (Human Body Communication) communication). It would be appreciated that the communication apparatus 1 can perform the near field communication using an electric field by facing a transmission side electrode and a reception side electrode each other without via a human body.

The NFC communication is, for example, short-range wireless communication that uses a high-frequency magnetic field having a predetermined frequency (for example, 13.56 MHz) as a medium standardized as ISO/IEC 14443. It should be noted that the NFC communication is not limited thereto, and may be other short-range wireless communication using a magnetic field such as contact type communication that has a communication distance of up to several mms (international standard: ISO/IEC 10536) and vicinity type communication that has a communication distance of about 50 cm to 1 m (international standard: ISO/IEC 15693), for example.

The HBC communication is short-range wireless communication. Thus, an electric field is generated by capacitive coupling of two electrodes, and transmission is performed using the human body of the user as the communication medium through a change in the electric field (potential). The standardized standard of the HBC communication includes IEEE802.15.6 HBC and ISO/IEC 17982.

The communication apparatus 1 includes a device host 11, a memory 12, a data converter 13, an NFC digital processor 14, an NFC analog processor 15, an HBC digital processor 16, and an HBC analog processor 17.

The communication apparatus 1 may be a stand-alone apparatus that performs the short-range wireless communication, or may be a component that is a communication chip module or a communication IC, which is embedded in another apparatus such as a smartphone (mobile terminal), a personal computer, and a server apparatus, as a component.

The device host 11 is, for example, a CPU (Central Processing Unit), a ROM (Read Only Memory), an RAM (Random Access Memory), or the like, and controls the entire communication apparatus 1. The device host 11 generates data-to-be-transmitted that is transmitted to a partner apparatus being a communication partner, transmits the transmitted data to the data converter 13, and acquires received data supplied from the data converter 13. In a case where the communication apparatus 1 is embedded in another apparatus as a component, the device host 11 controls data exchange between an upper controller that controls a main body of the apparatus, in which the communication apparatus 1 is embedded, and the data converter 13. The data-to-be-transmitted and the data-to-be-received also include commands and messages.

The memory 12 stores a program that is used to control the entire communication apparatus 1, and data necessary for transmission and reception. The memory 12 is, for example, a non-volatile memory, for example, an EEPROM (Electronically Erasable and Programmable Read Only Memory), an SRAM (Static Random Access Memory) that is backed up by a battery, or the like.

The data converter 13 converts data to be transmitted and received into data of a signal format of the NFC communication or the HBC communication. Specifically, in a case where the communication apparatus 1 transmits data, the data converter 13 converts the transmitted data supplied from the device host 11 into data of the signal format of the NFC communication or the HBC communication, and supplies the converted data to the NFC digital processor 14 or the HBC digital processor 16. In addition, in a case where the communication apparatus 1 receives data, the data converter 13 converts the data of the signal format of the NFC communication supplied from the NFC digital processor 14 or the data of the signal format of the HBC communication supplied from the HBC digital processor 16 into data of a data format that can be received by the device host 11, and supplies the converted data to the device host 11.

The signal format of the NFC communication is defined, for example, by ISO/IEC 21481 (NFC IP-2). The signal format of the HBC communication can comply with the specification of the human body communication defined, for example, by IEEE802.15.6 HBC or ISO/IEC 17982.

The NFC digital processor 14 is a processer that performs digital processing on a signal to be transmitted and a received signal of the NFC communication. For example, the NFC digital processor 14 performs modulation processing of a predetermined modulation method such as ASK (Amplitude Shift Keying)+BPSK (Binary Phase Shift Keying), demodulation processing corresponding thereto, error correction processing, and the like.

The NFC analog processor 15 is a processor that performs analog processing on the signal to be transmitted and the received signal of the NFC communication. For example, the NFC analog processor 15 performs detection processing that detects signals, AD conversion processing, or the like when receiving signals, and performs the ASK demodulation processing, load modulation processing, or the like when transmitting signals. A coil (loop coil) 21 and a capacitor 22 are connected to the NFC analog processor 15 as the antenna, and the coil 21 and the capacitor 22 configure a resonance circuit. The coil 21 and the capacitor 22 resonate at a resonance frequency, for example, of 13.56 MHz in accordance with the control by the NFC analog processor 15, and generate a magnetic field around the coil 21. Alternatively, the coil 21 and the capacitor 22 load-modulate a magnetic field generated by a partner apparatus (reader/writer) in accordance with the control by the NFC analog processor 15. As a result, data is transmitted and received using the magnetic field between the communication apparatus 1 and the partner apparatus.

The HBC digital processor 16 is a processor that performs digital processing on a signal to be transmitted and a received signal of the HBC communication. For example, the HBC digital processor 16 performs modulation processing of a predetermined modulation method such as BPSK, demodulation processing corresponding thereto, error correction processing, and the like.

The HBC analog processor 17 is a processor that performs analog processing on the signal to be transmitted and the received signal of the HBC communication. For example, the HBC analog processor 17 performs amplification processing of analog signals, filtering processing, AD conversion processing, and the like. A capacitor 23 that functions as an antenna is connected to the HBC analog processor 17. The capacitor 23 generates an electric field around the capacitor 23 in accordance with the control by the HBC analog processor 17. Alternatively, the capacitor 23 receives a change in the electric field generated by the partner apparatus via a human body in accordance with the control by the HBC analog processor 17. As a result, data is transmitted and received using the electric field between the communication apparatus 1 and the partner apparatus.

The communication apparatus 1 having the above-described configuration can support both kinds of near field communication of the NFC communication using a magnetic field and the HBC communication using an electric field, select one of the communication methods as necessary, and communicate with the partner apparatus.

2. Second Embodiment of Communication Apparatus

Figure 2:
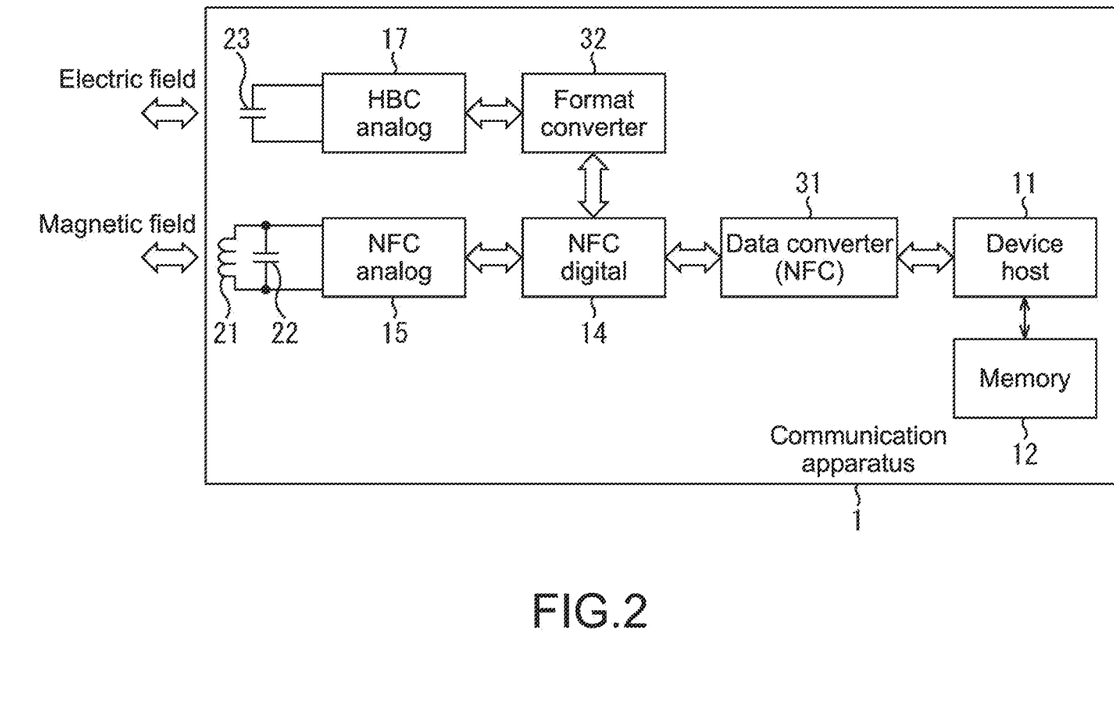
FIG. 2 is a block diagram showing a communication apparatus according to a second embodiment of the present disclosure.

FIG. 2 is a block diagram showing a communication apparatus according to a second embodiment of the present disclosure.

In FIG. 2, the configurations corresponding to the configurations of the first embodiment are denoted by the same reference signs. In the following, only configurations different from the configurations of the first embodiment will be described.

In the second embodiment, the data converter 13 and the HBC digital processor 16 of the first embodiment are replaced with a data converter 31 and a format converter 32, respectively, and other configurations are similar to those of the first embodiment.

The data converter 13 of the first embodiment can convert data of a format readable and writable by the device host 11 into data of both the signal formats of the NFC communication and the HBC communication. In contrast, the data converter 31 of the second embodiment has a function to convert data into only data of the signal format of the NFC communication.

The data converter 31 converts the data-to-be transmitted into data of the signal format of the NFC communication, adds a flag that indicates that the data is to be transmitted through the HBC communication or a flag that indicates that the data is to be transmitted through the NFC communication to the converted data-to-be-transmitted, and supplies the converted data-to-be-transmitted to the NFC digital processor 14. In addition, the data converter 31 converts data of the signal format of the NFC communication supplied from the NFC digital processor 14 into data of the format that can be received by the device host 11, and supplies the converted data to the device host 11.

In a case where the NFC digital processor 14 acquires the data-to-be-transmitted of the signal format of the NFC communication having the flag that indicates that the data is to be transmitted through the HBC communication from the data converter 31, the NFC digital processor 14 supplies the data-to-be-transmitted to the format converter 32. In addition, in a case where the NFC digital processor 14 acquires the data-to-be-transmitted of the signal format of the NFC communication having the flag that indicates that the data is to be transmitted through the NFC communication from the data converter 31, the NFC digital processor 14 performs digital processing such as modulation processing on the data-to-be-transmitted, and then supplies the data-to-be-transmitted to the NFC analog processor 15.

On the other hand, in a case where the received data is supplied to the NFC digital processor 14 from the format converter 32, the NFC digital processor 14 supplies the received data to the data converter 31. In addition, in a case where the received data of the signal format of the NFC communication is supplied from the NFC analog processor 15, the NFC digital processor 14 performs the digital processing on the received data such as demodulation processing and the like, and then supplies the processed data to the data converter 31.

The format converter 32 not only performs the processing by the HBC digital processor 16 of the first embodiment, but also converts the signal format of the NFC communication into the signal format of the HBC communication and vice versa. Specifically, the format converter 32 converts the data-to-be-transmitted of the signal format of the NFC communication supplied from the NFC digital processor 14 into data of the signal format of the HBC communication, performs the digital processing such as demodulation processing and the like on the data, and supplies the data to the HBC analog processor 17. In addition, in a case where the received data received through the HBC communication is supplied from the HBC analog processor 17 to the format converter 32, the format converter 32 performs the digital processing such as the demodulation processing and the like on the received data of the signal format of the HBC communication, then converts the data into data of the signal format of the NFC communication, and supplies the data to the NFC digital processor 14.

Other configurations of the second embodiment are similar to those of the first embodiment.

Also, the communication apparatus 1 having the above-described configuration can support both kinds of near field communication of the NFC communication using a magnetic field and the HBC communication using an electric field, select one of the communication methods as necessary, and communicate with the partner apparatus.

3. Third Embodiment of Communication Apparatus

Figure 3:
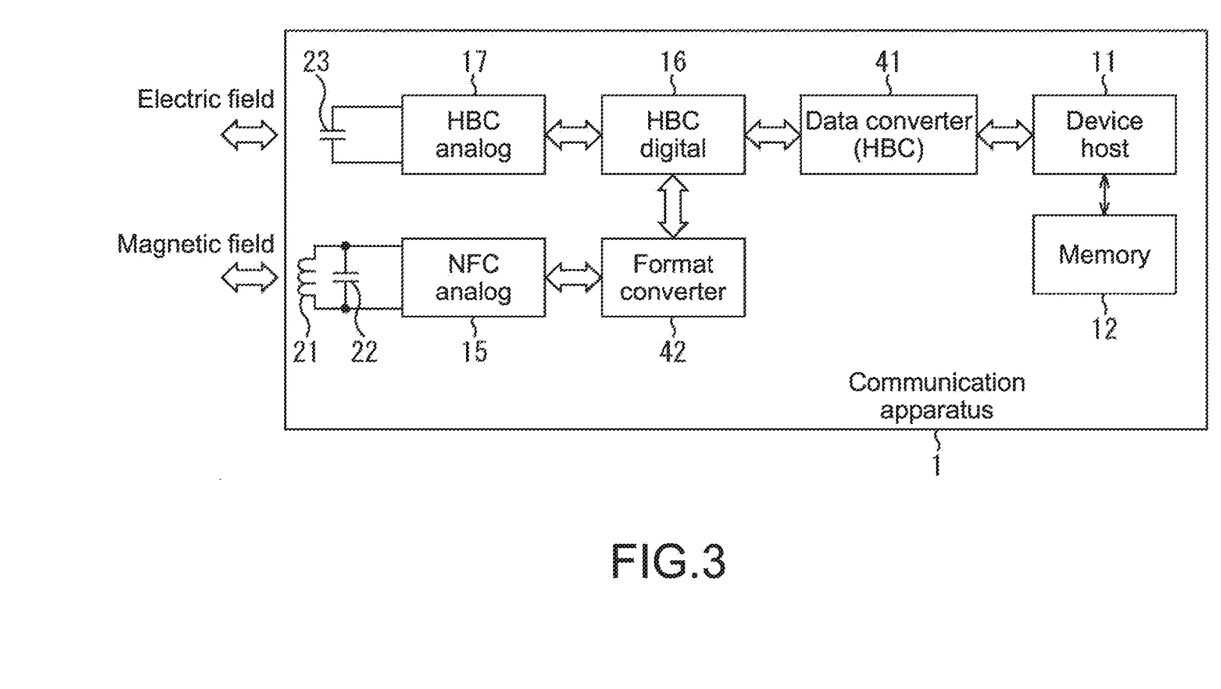
FIG. 3 is a block diagram showing a communication apparatus according to a third embodiment of the present disclosure.

FIG. 3 is a block diagram showing a communication apparatus according to a third embodiment of the present disclosure.

In FIG. 3, the configurations corresponding to the configurations of the first embodiment are denoted by the same reference signs. In the following, only configurations different from the configurations of the first embodiment will be described.

In the third embodiment, the data converter 13 and the NFC digital processor 14 of the first embodiment are replaced with a data converter 41 and a format converter 42, respectively, and other configurations are similar to those of the first embodiment.

The data converter 13 of the first embodiment can convert data of a format readable and writable by the device host 11 into both the signal formats of the NFC communication and the HBC communication. In contrast, the data converter 41 of the third embodiment has a function to convert the data into only the data of the signal format of the HBC communication.

The data converter 41 converts the data-to-be-transmitted into data of the signal format of the HBC communication, adds a flag that indicates that the data is to be transmitted through the NFC communication or a flag that indicates that the data is to be transmitted through the HBC communication, to the converted data-to-be-transmitted, and supplies the converted data-to-be-transmitted to the HBC digital processor 16. In addition, the data converter 41 converts the data of the signal format of the HBC communication supplied from the HBC digital processor 16 into data of a format that can be received by the device host 11, and supplies the converted data to the device host 11.

In a case where the HBC digital processor 16 acquires the data-to-be-transmitted of the signal format of the HBC communication having the flag that indicates that the data is to be transmitted through the NFC communication from the data converter 41, the HBC digital processor 16 supplies the data-to-be-transmitted to the format converter 42. In a case where the HBC digital processor 16 acquires the data-to-be-transmitted of the signal format of the HBC communication having the flag that indicates that the data is to be transmitted through the HBC communication from the data converter 41, the HBC digital processor 16 performs digital processing such as modulation processing and the like on the data-to-be-transmitted, and then supplies the data-to-be-transmitted to the HBC analog processor 17.

On the other hand, in a case where the received data is supplied from the format converter 42, the HBC digital processor 16 supplies the received data to the data converter 41. In addition, in a case where the received data of the signal format of the HBC communication is supplied from the HBC analog processor 17, the HBC digital processor 16 performs the digital processing on the received data such as demodulation processing and the like, and then supplies the processed data to the data converter 41.

The format converter 42 not only performs the processing by the NFC digital processor 14 of the first embodiment, but also converts the signal format of the NFC communication into the signal format of HBC communication. Specifically, the format converter 42 converts the data-to-be-transmitted of the signal format of the HBC communication supplied from the HBC digital processor 16 into data of the signal format of the NFC communication, performs the digital processing such as demodulation processing and the like on the data, and supplies the data to the NFC analog processor 15. In addition, in a case where the received data received through the NFC communication is supplied from the NFC analog processor 15 to the format converter 42, the format converter 42 performs the digital processing such as the demodulation processing and the like on the received data of the signal format of the NFC communication, then converts the data into data of the signal format of the HBC communication, and supplies the data to the HBC digital processor 16.

Other configurations of the third embodiment are similar to those of the first embodiment.

Also, the communication apparatus 1 having the above-described configuration can support both kinds of near field communication of the NFC communication using a magnetic field and the HBC communication using an electric field, select one of the communication methods as necessary, and communicate with the partner apparatus.

4. Fourth Embodiment of Communication Apparatus

Figure 4:
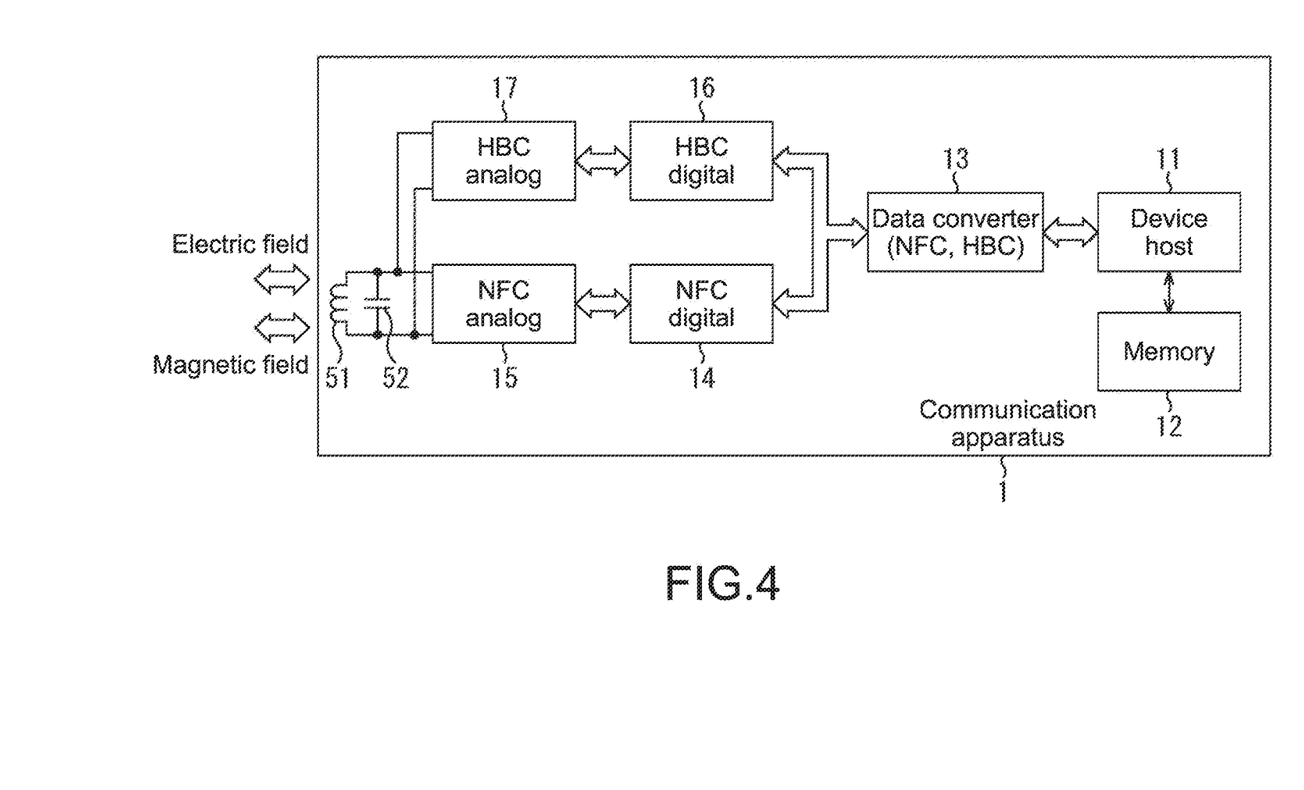
FIG. 4 is a block diagram showing a communication apparatus according to a fourth embodiment of the present disclosure.

FIG. 4 is a block diagram showing a communication apparatus according to a fourth embodiment of the present disclosure.

In FIG. 4, the configurations corresponding to the configurations of the first embodiment are denoted by the same reference signs. In the following, only configurations different from the configurations of the first embodiment will be described.

In the fourth embodiment, the device host 11, the memory 12, the data converter 13, the NFC digital processor 14, the NFC analog processor 15, the HBC digital processor 16, and the HBC analog processor 17 are configured similarly to the first embodiment.

In other words, the configuration of the fourth embodiment is similar to the configuration of the first embodiment except for an antenna part of the NFC communication and the HBC communication.

Further, in the fourth embodiment, the coil 21 and the capacitors 22 and 23 of the first embodiment are replaced with a coil 51 and a capacitor 52. The coil 51 and the capacitor 52 are connected to both the NFC analog processor 15 and the HBC analog processor 17, and the antenna is shared by the NFC communication and the HBC communication.

In a case where data is transmitted or received through the NFC communication, the NFC analog processor 15 controls the magnetic field generated around the coil 51.

In a case where data is transmitted or received through the HBC communication, the HBC analog processor 17 controls the electric field generated around the capacitor 52.

Other configurations of the fourth embodiment are similar to those of the first embodiment.

Also, the communication apparatus 1 having the above-described configuration can support both kinds of near field communication of the NFC communication using a magnetic field and the HBC communication using an electric field, select one of the communication methods as necessary, and communicate with the partner apparatus.

The fourth embodiment shown in FIG. 4 has the configuration in which the antenna parts of the first embodiment of FIG. 1 are replaced with the antenna shared by the NFC communication and the HBC communication. It is also possible to replace the antenna parts of each of the second embodiment of FIG. 2 and the third embodiment of FIG. 3 with the antenna shared by the NFC communication and the HBC communication of the configuration of the fourth embodiment.

5. Processing Flow of Communication Start

Figure 5:
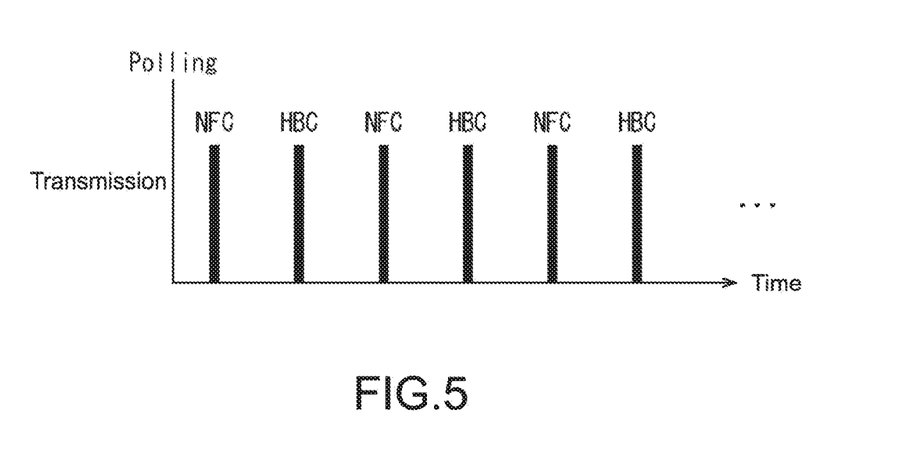
FIG. 5 is a diagram that illustrates how to control communication when starting communication with a partner apparatus.
Figure 6:
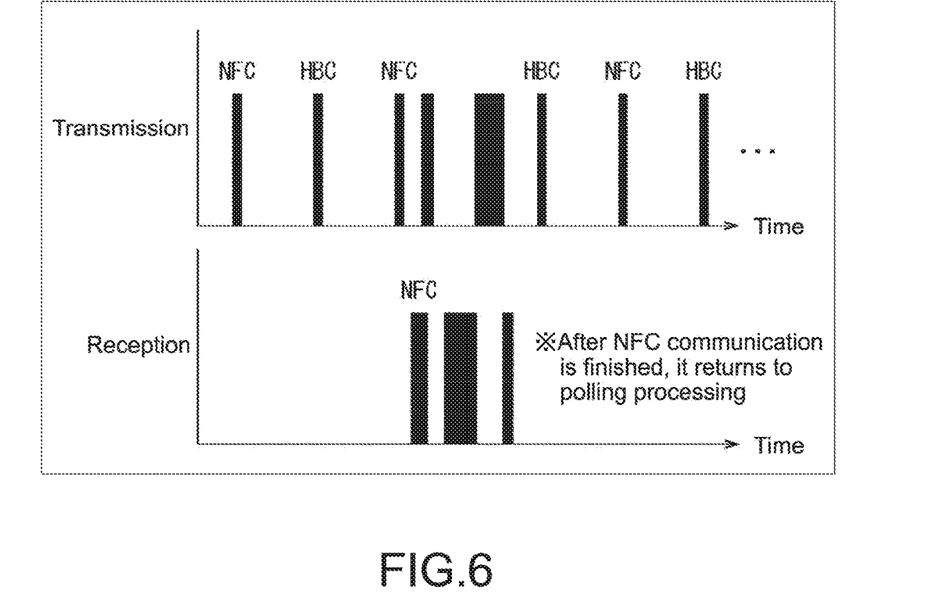
FIG. 6 is diagrams that each illustrates how to control communication when starting communication with the partner apparatus.
Figure 7:
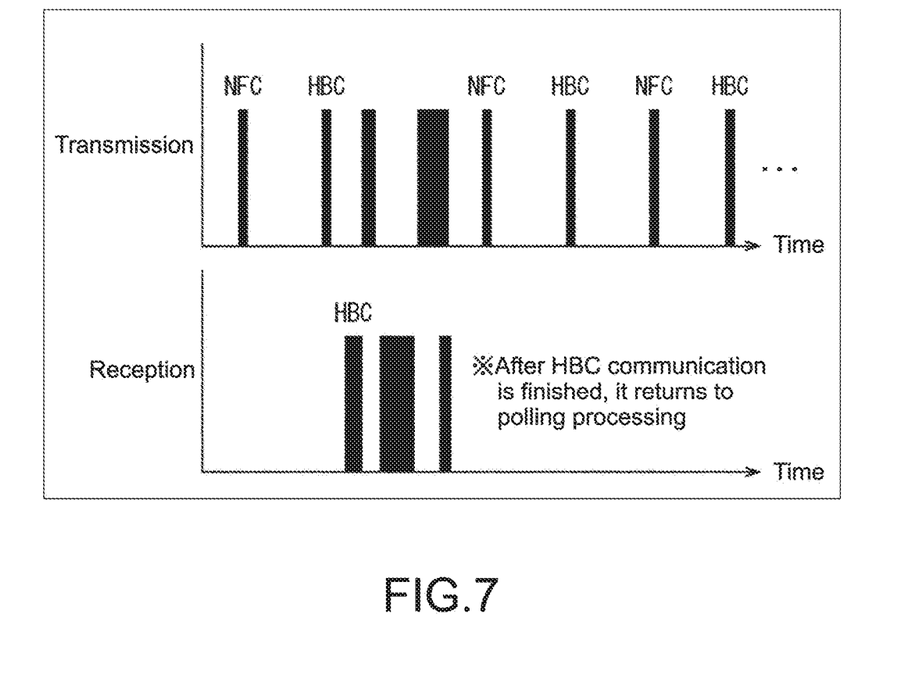
FIG. 7 is diagrams that each illustrates how to control communication when starting communication with the partner apparatus.

With reference to FIG. 5 to FIG. 7, how to control communication when starting communication with a partner apparatus will be described.

As shown in FIG. 5, the communication apparatus 1 alternately outputs, as polling commands for detecting a communication partner, the signals of the NFC communication and the signals of the HBC communication.

Then, as shown in FIG. 6, in a case where the partner apparatus replies to the polling command of the NFC communication, the communication apparatus 1 communicates with the partner apparatus, which has replied, through the NFC communication.

On the other hand, as shown in FIG. 7, in a case where the partner apparatus replies to the polling command of the HBC communication, the communication apparatus 1 communicates with the partner apparatus, which has replied, through the HBC communication.

After the communication with the partner apparatus through the NFC communication or the HBC communication is finished, the communication apparatus 1 starts the polling processing again, i.e., alternately outputs, as the polling commands, the signals of the NFC communication and the signals of the HBC communication.

As described above, by transmitting the polling commands of the NFC communication and the polling commands of the HBC communication with the time division, the communication apparatus 1 can start communication with a partner apparatus even if the partner apparatus employs any communication method of the NFC communication or the HBC communication.

6. Configuration Example of Shared Antenna

Figure 8A:
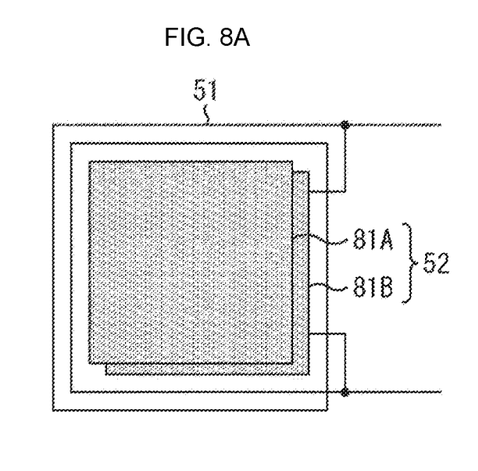
FIGS. 8A and 8B are diagrams showing first and second configuration examples of an antenna.
Figure 8B:
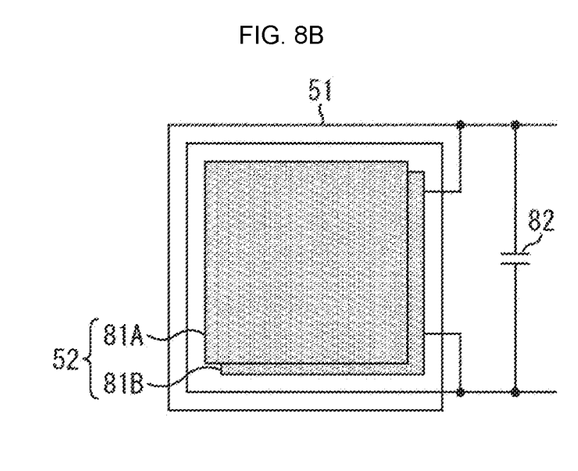

FIGS. 8A and 8B show configuration examples of an antenna shared by the NFC communication and the HBC communication.

FIG. 8A shows a first configuration example of an antenna shared by the NFC communication and the HBC communication.

In general, the capacitor of the LC resonance circuit is a chip capacitor or the like. In contrast, in a case where the antenna is shared by the NFC communication and the HBC communication, as shown in FIG. 8A, the capacitor 52 includes two flat plate-like pattern electrodes 81A and 81B arranged in parallel on a surface side and a rear side of a board having a predetermined thickness, for example.

The coil 51 is patterned on the board having the predetermined thickness so as to be arranged around the two pattern electrodes 81A and 81B, for example.

With the above-mentioned configuration, the capacitor 52 can be shared by a resonance capacitor for the NFC communication and the antenna for the HBC communication.

This allows the antenna for the NFC communication and the antenna for the HBC communication to be integrated. In a case where a user communicates through either communication method, the user has only to bring a partner apparatus or a part of a human body, e.g., hand, at the same position closer to the antenna.

FIG. 8B shows a second configuration example of an antenna shared by the NFC communication and the HBC communication.

The thickness of the board, on which the two pattern electrodes 81A and 81B of the capacitor 52 are arranged, can be determined as appropriate corresponding to a dielectric constant of the board. However, a sufficient capacity may not be provided only by the capacitor 52 in a case where a board having a high dielectric constant is unable to be used or where the pattern electrodes 81A and 81B having sufficiently wide areas are not provided.

In such cases, the capacitor 82 such as a chip capacitor can be provided in parallel with the capacitor 52 as shown FIG. 8B.

Figure 9:
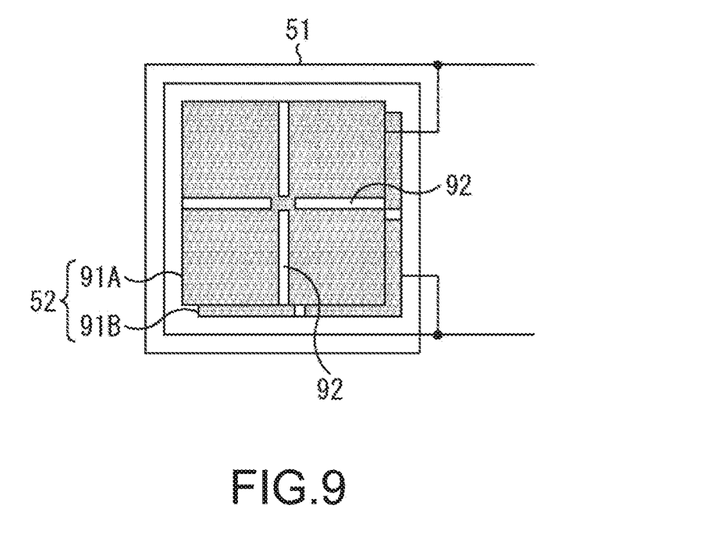
FIG. 9 is a third configuration example of the antenna.

FIG. 9 shows a third configuration example of the antenna shared by the NFC communication and the HBC communication.

The third configuration example is different from the first and the second configuration examples in that the capacitor 52 is constituted of pattern electrodes 91A and 91B, and a plurality of (four in FIG. 9) slits 92 are formed in the pattern electrodes 91A and 91B, respectively.

In a case where the pattern electrodes have a simple flat plate shape similar to the pattern electrodes 81A and 81B shown in FIGS. 8A and 8B, in the communication using a magnetic field, an eddy current is generated, a Q value of the LC resonance circuit is lowered, and communication performance is degraded.

In view of the above, as shown in FIG. 9, one or more slits 92 are formed in the respective pattern electrodes 91A and 91B. Therefore, it is possible to significantly inhibit the generation of the eddy current.

It should be noted that the shapes of the slits for inhibiting the generation of the eddy current are not limited to the shapes of the slits 92 shown in FIG. 9. Without providing the slits, the pattern electrodes may be separated into pieces, and may be connected in parallel.

In addition, the shapes of the slits 92 formed in the two pattern electrodes 91A and 91B may be the same or different.

Figure 10:
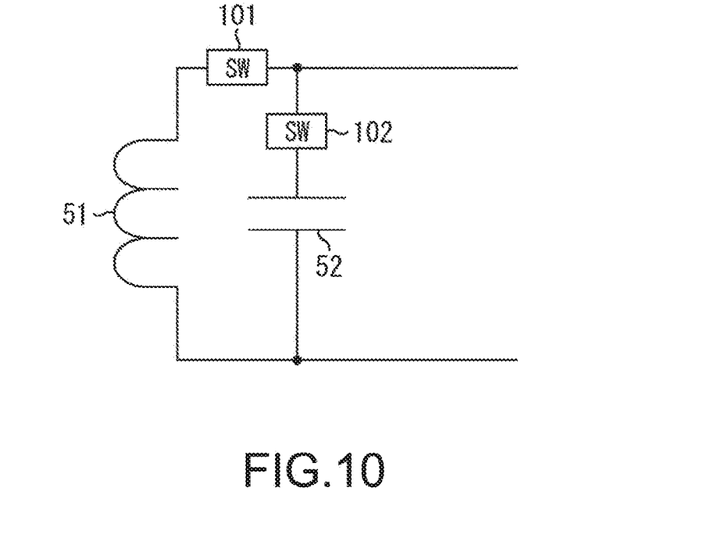
FIG. 10 is a fourth configuration example of the antenna.

FIG. 10 shows a fourth configuration example of the antenna shared by the NFC communication and the HBC communication.

In the fourth configuration example of the antenna shown in FIG. 10, switch devices 101 and 102 (SW 101 and SW 102) are provided in addition to the coil 51 and the capacitor 52. The switch device 101 turns on/off an electrical connection of the coil 51, and the switch device 102 turns on/off an electrical connection of the capacitor 52. The capacitor 52 may employ any of the configurations shown in FIGS. 8A and 8B where no slit 92 is formed and the configuration shown in FIG. 9 where one or more slits 92 are formed. In addition, the shapes of the slits 92 may be different from those shown in FIG. 9.

In a case where the resonance circuit including the coil 51 and the capacitor 52 resonates, a communication distance is long, a band is narrow, and a transmission speed of the data is slow. In a case where the resonance circuit including the coil 51 and the capacitor 52 does not need to resonate, the data can be transmitted and received at higher speed.

Thus, by providing the switch devices 101 and 102, it is possible to select and execute the communication method of performing communication, in which the resonance circuit resonates at the resonance frequency in conformity with a predetermined standard, for example, of 13.56 MHz, or the communication method of transmitting and receiving the data in a non-resonant manner at high speed, as necessary.

Figure 11:
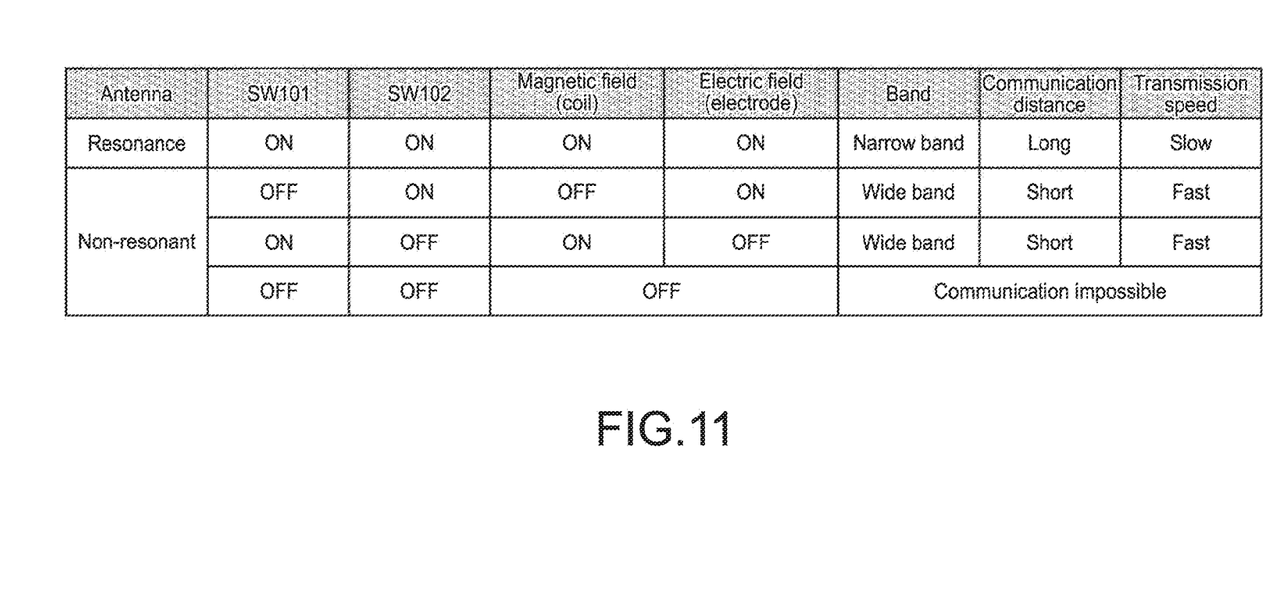
FIG. 11 is a diagram that summarizes characteristics of communication in the state where two switch devices are turned on or off.

FIG. 11 is a diagram that summarizes characteristics of the communication in the state where the respective switch devices 101 and 102 are turned on or off.

In a case where both the switch devices 101 and 102 are turned on, the resonance circuit including the coil 51 and the capacitor 52 resonates at a predetermined frequency. The communication apparatus 1 can communicate through both the NFC communication using a magnetic field and the HBC communication using an electric field. In this case, the communication distance is longer than the communication distance of other communication described later, the communication band is narrow, and the transmission speed is slow. However, it is possible to perform the near field communication in conformity with a predetermined standard such as ISO/IEC 14443. In conformity with the standard of ISO/IEC 14443, the transmission rate is, for example, 106 kbps, 212 kbps, or 424 kbps.

In contrast, in a case where the switch device 101 is turned off and the switch device 102 is turned on, only the capacitor 52 is electrically connected, and the antenna therefore does not resonate. The communication apparatus 1 can perform communication only through the HBC communication using an electric field. In this case, the communication distance is shorter than that of the resonance communication described above, the communication band is wide, and the transmission speed is fast. In conformity with the standard of ISO/IEC 17982, it is possible to perform communication at high speed of the transmission rate up to 40.68 Mbps.

In addition, in a case where the switch device 101 is turned on and the switch device 102 is turned off, only the coil 51 is electrically connected, and the antenna therefore does not resonate. The communication apparatus 1 can perform communication through only the NFC communication using a magnetic field. However, the NFC communication is unique NFC communication not in conformity with a predetermined standard. The communication distance is shorter than that of the resonance communication described above, the communication band is wide, and the transmission speed is fast.

In a case where both the switch devices 101 and 102 are turned off, the communication through any of the NFC communication using a magnetic field and the HBC communication using an electric field is impossible.

As described above, according to the fourth configuration example of the antenna, by controlling turning on/off the switch devices 101 and 102, it is possible to select the NFC communication in conformity with a predetermined standard, the high speed NFC communication not in conformity with the standard, or the high speed HBC communication, and to perform the selected communication. For example, the device host 11 performs the on/off control of the switch devices 101 and 102.

As described above, the communication apparatus 1 illustrated in the respective embodiments can support both kinds of near field communication of the NFC communication using a magnetic field and the HBC communication using an electric field, select one of the communication methods as necessary, and perform communication with the partner apparatus.

The embodiments of the present disclosure are not limited to the above-described embodiments, and variations and modifications may be made without departing from the scope of the present disclosure.

For example, all or a part of the above-described plurality of embodiments may be combined and adopted.

For example, the present disclosure may take a configuration of cloud computing that shares one function by a plurality of devices via a network and performs co-processing.

In addition, the respective steps described in the flowcharts described above may be executed by one apparatus, or may also be executed by sharing the steps with a plurality of apparatuses.

Further, in a case where one step includes a plurality of processes, the plurality of processes included in one step may be executed by one apparatus, or may also be executed by sharing the steps with a plurality of apparatuses.

It should be noted that the effects described in the present specification are merely illustrative and are not limitative, and may have effects other than the effects described in the present specification.

Further, the present disclosure may also have the following configurations.

(1) An antenna shared by near field communication using a magnetic field and near field communication using an electric field.

(2) The antenna according to (1), in which
the near field communication using an electric field is a human body communication using a human body as a communication medium.

(3) The antenna according to (1) or (2), including:
a coil;
a capacitor; and
a switch that turns on/off an electrical connection of each of the coil and the capacitor.

(4) The antenna according to (3), in which
the capacitor includes two flat plate-like electrodes.

(5) The antenna according to (4), in which
the two electrodes have slits.

(6) A communication apparatus, including:
a first near field communication unit that performs communication in a non-contact manner using a magnetic field;
a second near field communication unit that performs communication in a non-contact manner using an electric field; and
an antenna shared by communication of the first near field communication unit and communication of the second near field communication unit.

(7) The communication apparatus according to (6), in which
the second near field communication unit performs communication using a human body as a communication medium in a non-contact manner using an electric field.

(8) The communication apparatus according to (6) or (7), in which
the antenna includes
a coil,
a capacitor, and
a switch that turns on/off an electrical connection of each of the coil and the capacitor.

(9) The communication apparatus according to (8), further including:
a controller that controls the switch.

(10) The communication apparatus according to (8) or (9), in which
the capacitor includes two flat plate-like electrodes.

(11) The communication apparatus according to (10), in which
the two electrodes have slits.

REFERENCE SIGNS LIST 1 communication apparatus
12 memory
13 data converter
14 NFC digital processor
15 NFC analog processor
16 HBC digital processor
17 HBC analog processor
21 coil
22, 23 capacitor
31 data converter
32 format converter
41 data converter
42 format converter
51 coil
52 capacitor
81A, 81B pattern electrode
82 capacitor
91A, 91B pattern electrode
92 slit
101, 102 switch device

The invention claimed is:

1. An antenna, comprising:
   a coil, wherein the coil is connected to a first near field communication (NFC) processor, and
   wherein the first NFC processor processes a first signal based on a magnetic field of the coil; and
   a capacitor, wherein the capacitor is connected to a second NFC processor, and
   wherein the second NFC processor processes a second signal based on an electric field of the capacitor, wherein the first NFC processor is different from the second NFC processor, and
   wherein the antenna is shared between the first NFC processor and the second NFC processor.

2. The antenna according to claim 1, wherein the second NFC processor is associated with a human body communication, and wherein the human body communication uses a human body as a communication medium.

3. The antenna according to claim 1, further comprising:
   a switch configured to turn on or off an electrical connection of each of the coil and the capacitor.

4. The antenna according to claim 1, wherein the capacitor includes two flat plate-like electrodes.

5. The antenna according to claim 4, wherein the two flat plate-like electrodes have slits.

6. A first communication apparatus, comprising:
   a first near field communication (NFC) processor;
   a second NFC processor different from the first NFC processor;
   an antenna that comprises:
      a coil, wherein the coil is connected to the first NFC processor, and
      wherein the first NFC processor is configured to process a first signal based on a magnetic field of the coil; and
      a capacitor, wherein the capacitor is connected to the second NFC processor, and
      wherein the second NFC processor is configured to process a second signal based on an electric field of the capacitor;
   a first NFC unit configured to communicate with a second communication apparatus in a non-contact manner, wherein the first NFC unit is configured to communicate based on the magnetic field; and
   a second NFC unit configured to communicate with the second communication apparatus in a non-contact manner, wherein the second NFC unit is configured to communicate based on the electric field,
   wherein the antenna is shared between the first NFC processor and the second NFC processor.

7. The first communication apparatus according to claim 6, wherein
   the second NFC unit is further configured to:
      communicate with the second communication apparatus based on a human body as a communication medium.

8. The first communication apparatus according to claim 6, wherein
   the antenna further includes
      a switch configured to turn on or off an electrical connection of each of the coil and the capacitor.

9. The first communication apparatus according to claim 8, further comprising:
   a controller configured to control the switch.

10. The first communication apparatus according to claim 6, wherein
   the capacitor includes two flat plate-like electrodes.

11. The first communication apparatus according to claim 10, wherein the two flat plate-like electrodes have slits.

* * * * *